April 24, 1962
D. G. THOMAS
3,031,034
DAMPER
Filed July 13, 1959
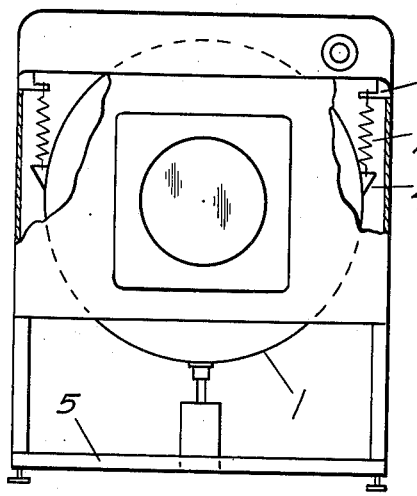
FIG.1
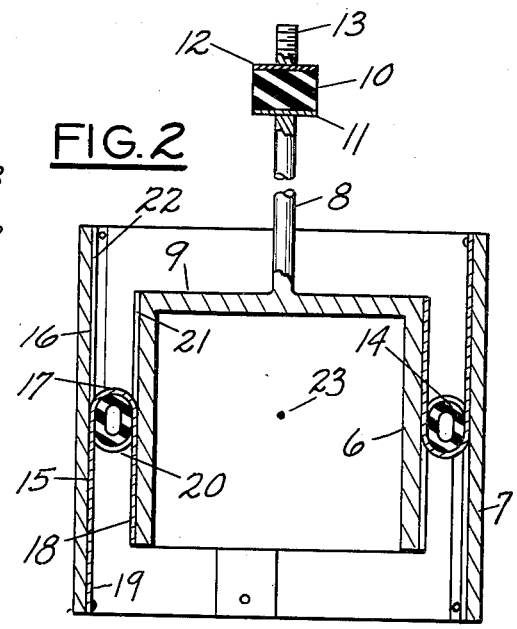
FIG.2
FIG.3
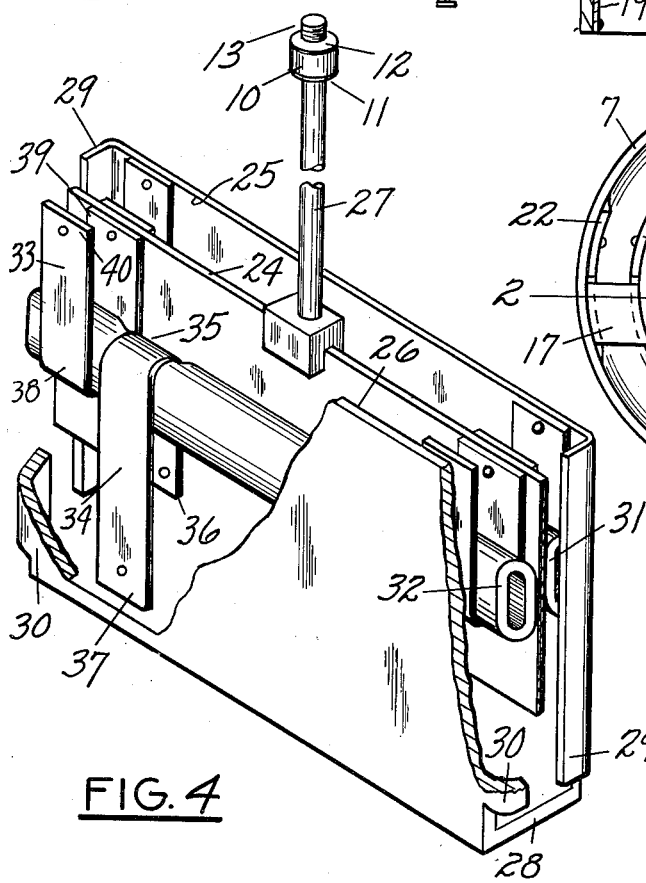
FIG.4
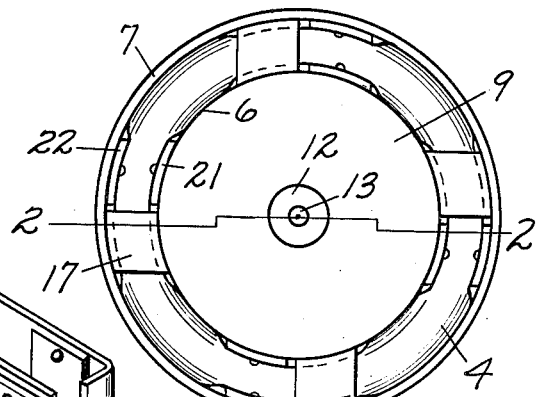
INVENTOR.
BY David G. Thomas
Ralph Hammar
Attorney

United States Patent Office 3,031,034
Patented Apr. 24, 1962

3,031,034
DAMPER
David G. Thomas, Erie, Pa., assignor to Lord Manufacturing Company, Erie, Pa., a corporation of Pennsylvania
Filed July 13, 1959, Ser. No. 826,774
3 Claims. (Cl. 188—1)

This invention is a damper utilizing the internal friction of an elastomeric body confined between and in rolling contact with a pair of surfaces respectively on relatively movable parts between which damping is desired. The body is held in place by engaging opposite sides of the body to confine the body between the straps and insure a unique position of the body for any relative position of the surfaces.

In the drawing, FIG. 1 is a diagrammatic view of an installation utilizing a damper, FIG. 2 is a section on line 2—2 of FIG. 3, FIG. 3 is a top view of the damper, and FIG. 4 is a perspective of a modification.

FIG. 1 shows the damper used in an automatic washing machine having a tub 1 supported by a plurality of coil springs 2 arranged between brackets 3 on the supporting structure and brackets 4 on the tub. During centrifugal extraction, the centrifugal forces resulting from unbalanced distribution of the clothes tend to cause objectionable excursion of the tub relative to its supporting structure unless damper means are provided for introducing a friction damping force resisting the excursion. Such a damper is shown connected between the lower end of the tub 1 and the bottom frame member 5 of the supporting structure.

The damper, as shown in greater detail in FIGS. 2 and 3, comprises inner and outer cylindrical members 6 and 7. The member 6 is of inverted cup-shape and has an upwardly extending stem 8 fixed to its bottom wall 9. At the upper end of the stem is a universal joint comprising a body 10 of rubber bonded between a plate 11 fixed to the stem and a plate 12 provided with an integral threaded extension 13 for bolting to the washing machine tub 1.

Between the cylinders 6 and 7 is an annular elastomeric body 14 i.e. a body of one of the elastomers such as natural or synthetic rubber. The body 14 may be a length of tubing of natural unstressed diameter greater than the radial spacing between the cylinders. The ends of the tubing need not be joined together. It is sufficient that the tubing be laid in place between the cylinders. In order to insure that the body 14 does not creep out from between the cylinders 6 and 7 under vibratory forces, four pairs of flexible straps 15, 16 are disposed about the periphery of the body. In each of the pairs of straps, the strap 15 has a downwardly facing loop 17 engaging the top of the body 14 and depending sides 18 and 19 respectively anchored to the lower ends of the cylinders 6 and 7. The strap 16 has an upwardly facing loop 20 engaging the under side of the body 14 and ends 21 and 22 respectively anchored to the upper ends of the cylinders 6 and 7. In effect, the body 14 is embraced between the oppositely facing loops 17 and 20 of each pair of straps and the body accordingly has a unique position for every relative position of the cylinders 6 and 7.

When the damper is used with the washing machine shown in FIG. 1, under unbalanced load the excursion of the tub 1 consists of the combination of an up and down vibratory movement and a lateral vibratory movement. The up and down movement causes vertical translation of the cylinder 6 relative to the cylinder 7 causing rolling of the body 14 between the adjacent surfaces of the cylinders. This produces a continual change in shape of the body 14 which is resisted by the internal friction of the elastomeric material of the body and thereby produces the damping force. The straps 15 and 16 maintain non sliding contact of the body 14 with the surfaces of cylinders 6 and 7 so that the entire damping force is obtained by the successive flattening or squeezing of different portions of the body 14 to an oval section. Lateral movement of the upper end of the stem 8 causes tilting or angular movement of the cylinder 6, for example about an axis 23 in the plane of the body 14. Under this tilting action, the diametrically opposite parts of the body 14 through which the axis 23 extends remains stationary while those respectively to the right and left of the axis move in opposite directions. When the part of the body 14 to the right of axis 23 is moving upward, the part of the body 14 to the left of the axis 23 moves downward. The tilting of the cylinders 6 relative to the cylinder 7 accordingly results in the same kind of damping action as does the translation. Since the cylinders 6 and 7 are symmetrical, the damping action is effective in all tilting or angular directions.

In FIG. 4 is shown a damper in which the damping action is confined to vibrations occurring in a plane. The damper comprises a plate 24 midway between plates 25 and 26. The plate 24 is fixed to the lower end of a stem 27 having at its upper end a flexible joint 10—13. The plates 25 and 26 are fixed at their lower end to a base 28 and have inwardly turned ends 29, 30 which are spaced from opposite ends of the plate 24. On opposite sides of the plate 24 are bodies 31 and 32 of elastomeric material, each of greater diameter than the spacing between the plate 24 and the adjacent plate 25 or 26, as the case may be. When installed, the bodies 31, 32 are flattened or squeezed to an oval shape as illustrated. The bodies are retained in place by pairs of flexible straps 33, 34 spaced along the length of the bodies. For the construction shown there are two pairs of straps for each body. In each pair of straps, the strap 34 has a downwardly facing loop 35 engaging the top of the associated body and has opposite ends 36 and 37 respectively fixed to the plate 24 and the plate 25 or 26, as the case may be. The strap 33 has an upwardly facing loop 38 engaging the under side of the associated body and opposite ends 39, 40 respectively fixed to the plate 24 and the plate 25 or 26, as the case may be. Upon vertical translation, the bodies 31, 32 are rolled between the plates 24, 25, 26 and the successive distortion or straining of different parts of the body to the oval shape is resisted by the internal friction of the bodies producing the damping force. Tilting of the plate 24 in its plane such as caused by a lateral force applied to the upper end of the stem 27 in the plane of the plate 24 results in the central parts of the bodies 31 and 32 remaining stationary while opposite ends move in opposite directions. The damper of FIG. 4 exerts only a small damping force in directions transverse to the plate 24 but in many applications it is adequate.

What is claimed as new is:

1. A damper comprising relatively movable parts having spaced opposed surfaces, an elastomeric body between and in rolling contact with said surfaces, said body having a cross section of normal diameter greater than the spacing between said surfaces whereby said body is compressed, and a pair of flexible straps in the form of oppositely facing loops embracing said body and having the ends of the loops anchored respectively to one and the other of said members for maintaining a unique position of said body for any relative position of said members.

2. A damper comprising relatively movable parts having telescoping inner and outer cylindrical surfaces spaced from each other, an elastomeric body encircling the inner cylindrical surface, said body having a cross section of normal diameter greater than the spacing between said surfaces whereby said body is compressed, and a pair of flexible straps in the form of oppositely facing loops embracing said body and having the ends of the loops anchored respectively to one and the other of said members for maintaining a unique position of said body for any relative position of said members.

3. The damper of claim 1 in which said body is a tube.

References Cited in the file of this patent

UNITED STATES PATENTS

| | | |
|---|---|---|
| 1,475,049 | Church | Nov. 20, 1923 |
| 2,276,494 | Kellogg | Mar. 17, 1942 |
| 2,578,903 | Smith | Dec. 18, 1951 |
| 2,819,060 | Neidhart | Jan. 17, 1958 |
| 2,819,063 | Neidhart | Jan. 17, 1958 |
| 2,821,273 | Sanford et al. | Jan. 28, 1958 |

FOREIGN PATENTS

| | | |
|---|---|---|
| 1,011,438 | France | Apr. 2, 1952 |
| 1,109,578 | France | Sept. 28, 1955 |
| 721,636 | Great Britain | Jan. 12, 1955 |
| 752,017 | Great Britain | July 4, 1956 |